United States Patent
Augeray

(10) Patent No.: US 7,958,207 B2
(45) Date of Patent: Jun. 7, 2011

(54) METHOD OF INSTALLING SOFTWARE FOR ENABLING A CONNECTION OF A PHONE TO AN INTERCONNECTED NETWORK

(75) Inventor: Denis Augeray, Parigne l'Eveque (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 196 days.

(21) Appl. No.: 12/307,930

(22) PCT Filed: Jul. 5, 2007

(86) PCT No.: PCT/IB2007/052637
§ 371 (c)(1),
(2), (4) Date: Jan. 8, 2009

(87) PCT Pub. No.: WO2008/007316
PCT Pub. Date: Jan. 17, 2008

(65) Prior Publication Data
US 2009/0210521 A1    Aug. 20, 2009

(30) Foreign Application Priority Data
Jul. 10, 2006    (EP) .................................. 06300787

(51) Int. Cl.
G06F 15/177    (2006.01)
H04M 1/64    (2006.01)
H04M 11/00    (2006.01)
(52) U.S. Cl. ........ 709/220; 709/221; 379/68; 379/93.29
(58) Field of Classification Search ................... 709/220, 709/221; 379/68, 93.29
See application file for complete search history.

(56) References Cited

U.S. PATENT DOCUMENTS

| 6,519,594 | B1* | 2/2003 | Li .................................. 719/312 |
| 6,781,955 | B2* | 8/2004 | Leung ........................... 370/232 |
| 7,417,959 | B2* | 8/2008 | Dorner et al. ................. 370/260 |
| 2001/0039611 | A1 | 11/2001 | Lin et al. |
| 2005/0089021 | A1 | 4/2005 | Vallejo |
| 2005/0114468 | A1 | 5/2005 | Philyaw |
| 2005/0180406 | A1 | 8/2005 | Sagiv |
| 2005/0180464 | A1 | 8/2005 | McConnell et al. |
| 2006/0159239 | A1* | 7/2006 | Hughes, Jr. ..................... 379/87 |
| 2006/0268847 | A1* | 11/2006 | Halbraich et al. ............. 370/352 |
| 2007/0081662 | A1* | 4/2007 | Altberg et al. ........... 379/355.03 |

FOREIGN PATENT DOCUMENTS
WO    0165365 A1    9/2001
* cited by examiner

*Primary Examiner* — Larry Donaghue
*Assistant Examiner* — Asghar Bilgrami
(74) *Attorney, Agent, or Firm* — Edward W. Goodman

(57) ABSTRACT

Method of installing software for enabling a connection of a phone to an interconnected network A method of installing a software on a computer using an operating system in order to enable a connection of a phone to an interconnected network, said method comprising the steps of: reading (303) audio input and audio output keys in operating system registers, said keys indicating devices which will be used for recording and playback, respectively, checking (304) if audio input and audio output key contents match with the phone, if yes, asking (305) end user to unplug the phone and returning to the reading step, if no, saving (306) audio input and audio output keys in a buffer, inviting (307) end user to plug in his phone to the computer, —installing (308) the software, writing (310) the saved audio input and audio output keys in the operating system register.

3 Claims, 3 Drawing Sheets

METHOD OF INSTALLING SOFTWARE FOR ENABLING A CONNECTION OF A PHONE TO AN INTERCONNECTED NETWORK

FIELD OF THE INVENTION

The invention relates generally to a method of installing software on a computer using an operating system in order to enable a connection of a phone to an interconnected network, such as the Internet or the Intranet.

The invention finds its application in the technical field of VOIP (stands for Voice over IP where IP means Internet Protocol) telephony.

BACKGROUND OF THE INVENTION

VOIP emerging technology gives to the end user the advantage to perform some phone call at very low rate.

Conventional phones implementing the VOIP technology are typically connected to a USB (stands for Universal Serial Bus) port of a personal computer PC using a USB cable and comprise software which uses peripheral capabilities of the PC such as sound card, broadband modem, etc. Such phones require the installation of software on the PC so that the PC is able to recognize the phone.

When the software installation is completed, the audio capabilities of the phone are set as default audio capabilities for the PC configuration. This means that all software applications running on the PC and requiring audio input or output will use the audio capabilities of the phone. Such a conventional installation mechanism is for example depicted in the Siemens Gigaset M34 user manual.

This configuration is suitable when the end-user uses his phone for Voice Over Internet Protocol communication. However, this configuration is not suitable when other audio applications such games or media players are running since it means that the end user has to use his phone for those applications. If the end user wants to use other devices such as sound card for audio input and/or output, he has to manually change the configuration of the device manager or unplug the phone in order to get the suitable device configuration.

SUMMARY OF THE INVENTION

Thus, it is an object of the present invention to provide a method of installing software on a computer using an operating system in order to enable a connection of a phone to an interconnected network, which is more convenient to the end user.

In accordance with the present invention, there is provided such an installation method, said method comprising the steps of:
  reading audio input and audio output keys in operating system registers, said keys indicating devices which will be used for recording and playback, respectively,
  checking if audio input and audio output key contents match with the phone,
  if yes, asking end user to unplug the phone and returning to the reading step,
  if no, saving audio input and audio output keys in a buffer, inviting end user to plug in his phone to the computer, installing the software, and
  writing the saved audio input and audio output keys in the operating system register.

Thanks to the method in accordance with the invention, the phone is connected to the interconnected network through the computer with its own audio capabilities for performing phone calls while the audio capabilities of the computer are used for other applications such as games, audio and/or video players, etc.

Beneficially, the saved audio input and audio output keys are always used as the preferred ones by default.

The invention also extends to a computer program product that comprises a set of instructions, which, when loaded into an integrated circuit of a computer causes the computer to carry out all the steps of the above-mentioned method.

These and other aspects of the present invention will be apparent from, and elucidated with reference to, the embodiment described herein.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
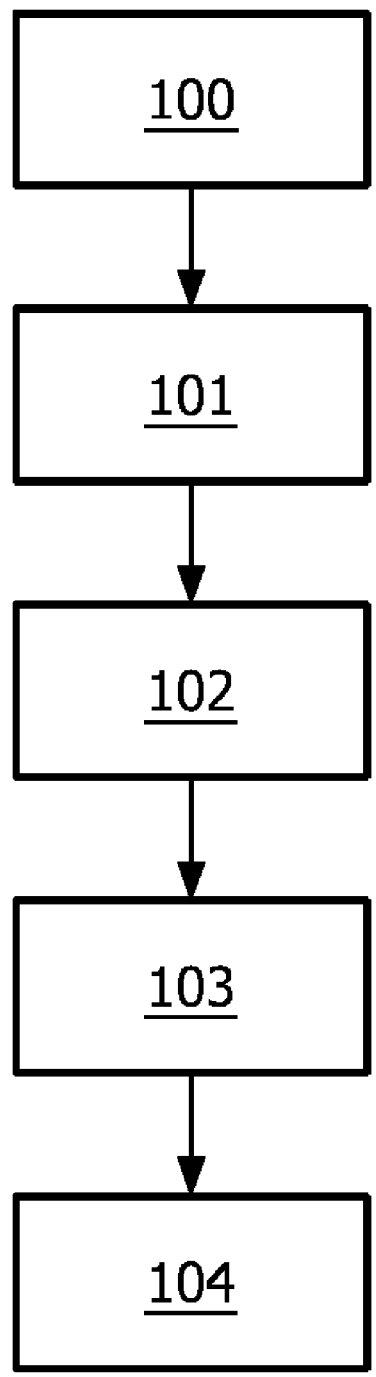
FIG. 1 is a schematic block diagram of a conventional method of installing software for enabling a connection of a phone to the Internet.

Referring to FIG. 1, a simplified method of installing software for enabling a connection of a phone to the Internet is depicted. In the following, it will be assumed that the phone is connectable to a USB port of the PC via a USB connection but it will be apparent to a skilled person that the invention is not limited to this type of connection.

In a first step 100, an information screen is displayed. This screen explains to the end user what the wizard (namely software installation process) will do during the installation process.

Optionally, a second step 101 consists in the end user license agreement EULA. The end user must agree with the EULA, in order to have the possibility to install the software.

In a third step 102, the end-user connects his phone to the PC. For example, the end user is invited to plug in his phone to one USB slot of the PC. The operating system OS of the PC is then able to read the Product IDentification PID and Vendor Identification VID through the USB port (PID/VID are in the product memory) and to install software so as to enable the operation of the VOIP functionality on the PC for this phone.

In a fourth step 103 the software is installed. This software comprises a softphone software for VOIP communication and also phone application software for managing the phone. The operating system OS defines the phone as the default device for audio input and/or output. End user is also invited to configure manually the default audio settings for applications (e.g. media players) other than VOIP communication if he wants to.

In a fifth step 104, a confirmation of successful installation is displayed and the software installation process is terminated.

The invention aims at modifying the above-described process in order to use suitable device software depending on software application launched.

Figure 2:
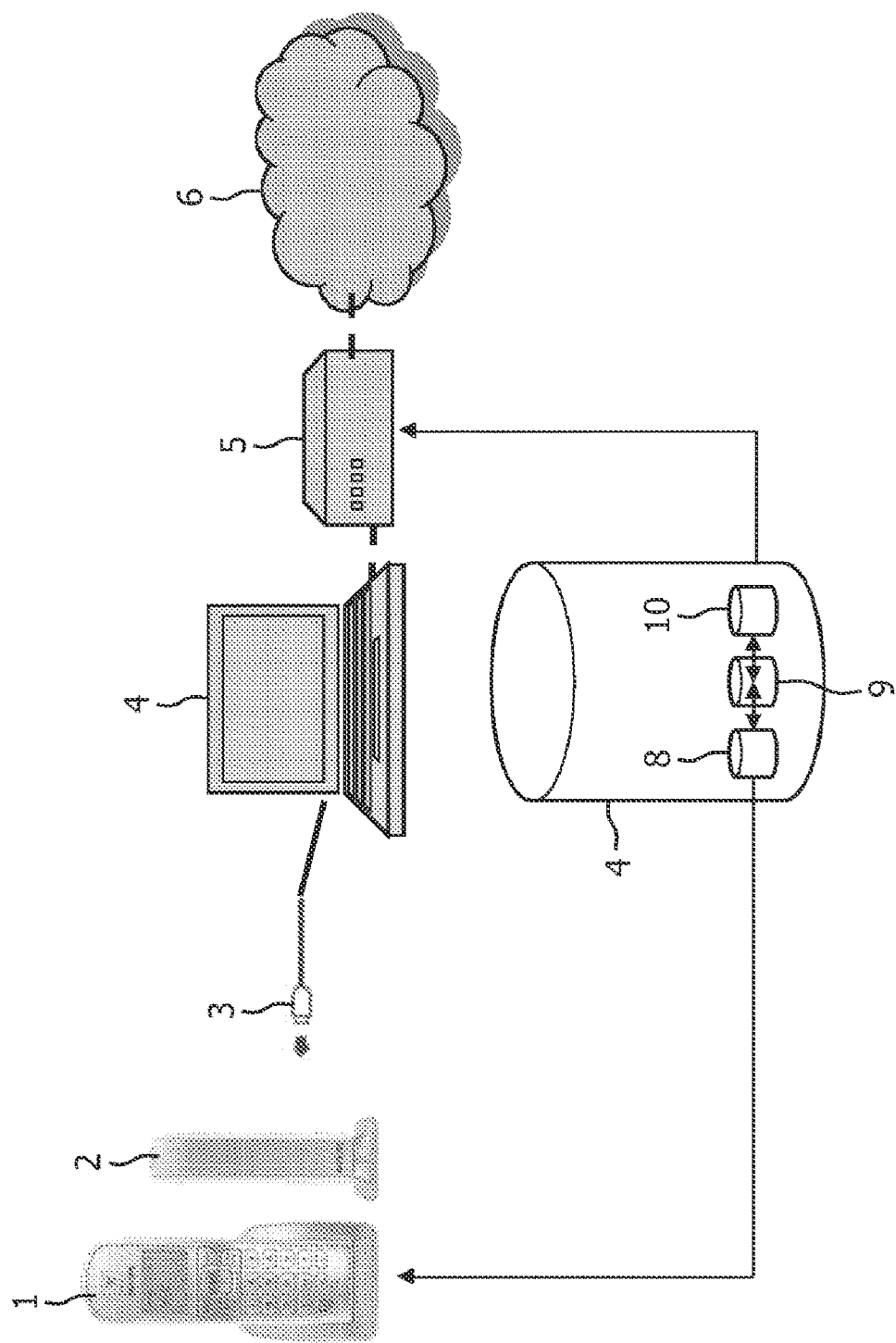
FIG. 2 is a schematic block diagram of a communication system in accordance with the invention.

Referring to FIG. 2, a communication system in accordance with the invention is depicted when all software are running.

The communication system comprises:

a cordless handset 1,
a base station 2,
a personal computer PC 4 and its associated narrow or broadband modem 5 connected to the interconnected network 6,
a USB wired connection 3 between the computer 4 and the base station 2.

It is to be noted the USB wired connection can also be a cordless link between a USB key plugged in the PC and the base station.

Three software applications 8-9-10 are running on the computer 4 when a VOIP communication is established:
a cordless phone application software 8 which manages the handset 1 and base station 2,
a softphone software 10 (for example Skype software) which manages an external link on the network side,
an Application Program Interface API 9 which manages data exchange between the cordless phone application software 8 and the softphone software 9.

The method of installing software comprises the installation of the cordless phone application software 8 and the API 9 plus some specific device audio software which are required in order to get a proper audio software operation depending on the application.

Figure 3:
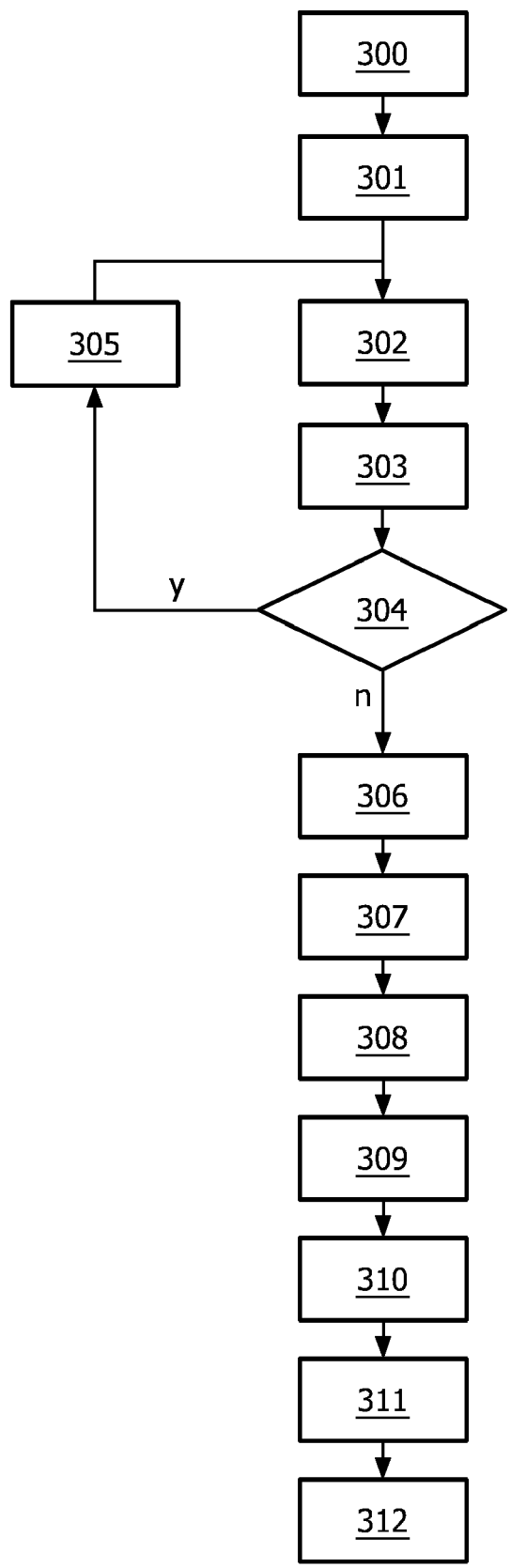
FIG. 3 is a schematic block diagram of a method of installing software for enabling a connection of a phone to the Internet in accordance with the invention.

Referring to FIG. 3, a method of installing software for enabling a connection of a phone to the Internet in accordance with the invention is depicted.

In a first step 300, an information screen is displayed. This screen explains to the end user what the wizard (namely software installation process) will do during the installation process.

Optionally, a second step 301 consists in the end user license agreement EULA. The end user must agree with the EULA, in order to have the possibility to install the software.

In a third step 302, the audio setting in the control panel of the OS is synchronized with the OS register. To this end, the installation method automatically opens the control panel on the audio setting window (namely the "Audio" tab in the "Sounds and Audio Devices Properties" window, said window being directly opened with component mmsys.cpl) and simulates the enter key (shell.Sendkeys("{ENTER} ",true);)

The installation method in accordance with the invention then reads in the OS register the keys in step 303, for example in the case of Windows XP OS:
HKEY_CURRENT_USER/Software/Microsoft/Multimedia/Sound Mapper/Playback
HKEY_CURRENT_USER/Software/Microsoft/Multimedia/Sound Mapper/Record
Playback register indicates which device will be used for audio output. Record register indicates which device will be used for audio input.

In a step 304, the installation method in accordance with the invention checks if the key contents match with the phone device.

If yes (y), it means that end user has already plug in his phone, and the method in accordance with the invention invites the end user to unplug the USB phone device (step 305) in order to retrieve default audio setting, synchronizes the configuration panel audio setting with the system register (step 302), and reads again keys in the OS register (step 303).

Otherwise (n), the installation method in accordance with the invention saves audio input and audio output keys in a buffer memory or a buffer file in step 306.

The end user is then invited to plug in his phone in step 307.

During step 308, the cordless phone application software, the softphone software and the API are installed. The end user waits for the end of the installation of the software.

In step 309, the audio setting in the OS control panel is synchronized with the OS register, in the same way as in step 302.

In step 310, the installation method writes the audio input and audio output keys saved in step 306:
HKEY_CURRENT_USER/Software/Microsoft/Multimedia/Sound Mapper/Playback
HKEY_CURRENT_USER/Software/Microsoft/Multimedia/Sound Mapper/Record Preferably, the installation method may configure default audio setting as the one preferred by the user by writing 0x00000001 in the Preferred Only key: HKEY_CURRENT_USER/Software/Microsoft/Multimedia/Sound Mapper/PreferredOnly Preferred Only register with content of 0x00000001 indicates that the current audio configuration (namely Playback and Record contents) is the default configuration. It means that the default audio device will always be used by default for application other than the softphone software and that the computer will not have to check, each time the phone is plugged in after the initial installation, if the audio input and output keys of the OS registers have been overwritten by the audio capabilities of the phone.

In step 311, the audio setting in the OS control panel is synchronized once again with the OS register. It means that the box "Use only default devices" in the "Audio" tab of the "Sounds and Audio Devices" Properties window is automatically ticked.

In a last step 312, a confirmation of successful installation is displayed and the installation method is terminated.

When the installation method is completed audio signals are routed to the audio capabilities of the phone (i.e. microphone and loudspeaker) when softphone software is running, and other audio application such as WindowsMediaPlayer are routed to the default audio device (e.g. sound card of the PC).

The invention may be implemented by means of an installation software. A set of instructions corresponding to this installation software and which is loaded into a program memory causes an integrated circuit of a computer to carry out the method in accordance with the installation software. The set of instructions may be stored on a data carrier such as, for example, a disk. The set of instructions can be read from the data carrier so as to load it into the program memory of the integrated circuit which will then fulfils its role.

Typically, the installation software is copied on a CD-ROM, said CD ROM being sold together with a cordless phone, said cordless phone comprising a base station and at least one handset. Alternatively, the installation software can also be made available through the Internet.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa.

The invention claimed is:

1. A method of installing software on a computer using an operating system in order to enable a connection of a phone to an interconnected network, said method comprising the steps of:

synchronizing audio settings in an operating system control panel with an operating system register of the computer;

reading audio input and audio output keys in the operating system register, said audio input and audio output keys indicating devices which will be used for recording and playback, respectively;

checking if audio input and audio output key contents match with the phone, and if the audio input and audio output key contents match with the phone, then (i) inviting an end user of the computer to unplug the phone and returning again to the synchronizing step followed by the reading step, else (ii) saving audio input and audio output keys indicating devices other than the phone which will be used for recording and playback, respectively, in a buffer;

inviting the end user to plug the phone into the computer;

installing the software;

writing the saved audio input and audio output keys in the operating system register; and synchronizing, once again, audio settings in the operating system control panel with the operating system register, wherein upon completion of the software installation, audio signals are routed to (1) audio capabilities of the phone in response to running softphone software and (2) an audio device of the computer other than the phone in response to running an audio application other than the software.

2. The method as claimed in claim 1, wherein the saved audio input and audio output keys are always used as the preferred ones by default for an application other than the softphone software, and further wherein the computer will not have to check, each time the phone is plugged in after an initial installation, if the audio input and audio output keys of the operating system register have been overwritten by the audio capabilities of the phone.

3. A non-transitory computer-readable medium embodied with a computer program that comprises a set of instructions for being loaded into an integrated circuit of a computer and executed to cause the computer to carry out all the steps of the method as claimed in claim 1.

* * * * *